United States Patent [19]

Bunch

[11] Patent Number: 5,655,245

[45] Date of Patent: Aug. 12, 1997

[54] APPARATUS FOR REMOVING DEBRIS FROM GRAVEL IN A FISH POND

[75] Inventor: G. W. Bunch, Aloha, Oreg.

[73] Assignee: Clearwater Fish & Pond Supply, Inc., Aloha, Oreg.

[21] Appl. No.: 493,424

[22] Filed: Jun. 22, 1995

[51] Int. Cl.$^6$ .................................................. A01K 63/04
[52] U.S. Cl. .................... 15/1.7; 119/232; 119/264; 210/242.1; 210/416.2
[58] Field of Search ...................... 15/1.7, 320, 345; 119/226, 228, 232, 263, 264; 210/169, 170, 242.1, 416.2

[56] References Cited

U.S. PATENT DOCUMENTS

| | | |
|---|---|---|
| 3,225,930 | 12/1965 | Willinger . |
| 3,360,129 | 12/1967 | Powers . |
| 4,094,788 | 6/1978 | Dockery . |
| 4,233,702 | 11/1980 | Zweifel . |
| 4,290,883 | 9/1981 | Sama . |
| 4,921,614 | 5/1990 | Frickman et al. . |
| 4,935,980 | 6/1990 | Leginus et al. . |
| 5,542,142 | 8/1996 | Young .......................... 15/1.7 |

*Primary Examiner*—David Scherbel
*Assistant Examiner*—Terrence Till
*Attorney, Agent, or Firm*—Klarquist Sparkman Campbell Leigh & Whinston, LLP

[57] ABSTRACT

A device for cleaning gravel and breaking up clusters of gravel in a fish pond comprises an integral body having a lower housing into which gravel is received and an upper housing which has an outlet for connection to a pump for drawing water and gravel into the integral body. The upper housing has a greater cross-sectional area than the lower housing so that the lower housing limits the size of gravel clusters entering the integral body from the pond bottom. A manifold encircles the lower housing of the integral body and has aligned perforations therein with the lower housing so that water introduced into the manifold radially and inwardly projects into the lower housing for breaking up the gravel clusters.

18 Claims, 1 Drawing Sheet

APPARATUS FOR REMOVING DEBRIS FROM GRAVEL IN A FISH POND

FIELD OF THE INVENTION

This invention relates generally to fish pond maintenance, and particularly to agitating gravel lining the bottom of a fish pond and removing debris accumulated therefrom.

BACKGROUND OF THE INVENTION

Fish ponds generally have gravel lining the bottom of the pond serving as a filter to catch excess debris, such as food and waste produced by the fish. Such debris, as well as decomposing plants, produce nitrogenous toxins which are harmful to fish and other living matter in the pond. Thus, regular maintenance of the pond includes removing the debris from the gravel. However, the accumulated debris hardens in the gravel, bonding individual stones together and thereby forming gravel clusters which makes removal of the debris difficult.

Gravel cleaners available for small aquariums comprise a suction device to lift the gravel from the aquarium bottom, separate it from debris, and return the gravel to the bottom. When gravel clusters enter a gravel cleaner for a small aquarium, the operator must tap the gravel cleaner against the aquarium wall to break up the cluster. In fish ponds, however, the gravel cleaners are large and such manipulation to break up the gravel cluster is not possible. Additionally, fish pond gravel clusters are larger than those in small aquariums and, consequently, more difficult to break up. Thus, prior art gravel cleaners are not designed to handle gravel clusters in large fish ponds.

Illustrative of prior art gravel cleaners for small aquariums are Dockery, U.S. Pat. No. 4,094,788; Sama, U.S. Pat. No. 4,290,883; Powers, U.S. Pat. No. 3,360,129; Willinger, U.S. Pat. No. 3,225,930; Leginus, U.S. Pat. No. 4,935,980; and Zweifel, U.S. Pat. No. 4,233,702. None of these are deemed to be suitable for cleaning the gravel in large-scale fish ponds.

Accordingly, there is a need for a gravel cleaner for use in ponds that will not only separate debris from gravel, but will also break up gravel clusters.

SUMMARY OF THE INVENTION

The present invention is a gravel cleaner for use in ponds which can break up clusters of gravel and separate debris contained therein. Gravel clusters are separated and individual gravel stones are cleaned of debris by water jets propelling into the gravel cleaner. The pond water is filtered of debris and returned to the pond by a pump. The cleaned and separated gravel is returned to the bottom of the pond free of debris.

In a preferred embodiment of the invention, an integral body includes a lower tubular housing and a larger, upper tubular housing connected end-to-end. The bottom end of the lower housing defines an inlet port into which gravel from a pond bottom is received and the upper housing includes an attached water outlet at its top end. The upper housing has a major portion of greater cross-sectional area and gradually tapers at its lower end to meet the lower housing. The lower housing is of lesser diameter than the upper housing and is operable to limit the size of the gravel clusters entering into the upper housing. A pump, when attached to the outlet, creates suction in the integral body, drawing pond water through the inlet port and into, first, the lower and, thence, the upper housing.

A manifold encircles the lower housing and has perforations therein aligned with perforations in the lower housing wall so that water introduced in the manifold is projected as jets radially and inwardly into the lower housing to break up gravel clusters drawn into the housing from the pond bottom and separate debris from the gravel.

After passing the jets from the manifold, the debris and gravel are drawn into the upper housing. Because the upper housing is of greater diameter than the lower housing, water flows through the upper housing at a lower velocity. The water flow in the upper housing is maintained at a rate that is insufficient to draw the relatively weighty gravel into the outlet, but is sufficient to draw out the lighter debris. The water and debris pumped through the outlet may be passed to a filter that filters the debris from the pond water. The filtered pond water can be returned to the pond, while the washed gravel falls back to the pond though the inlet port.

The foregoing and other objects, features, and advantages of the invention will become more apparent from the following detailed description of a preferred embodiment which proceeds with reference to the accompanying drawings.

DETAILED DESCRIPTION OF A PREFERRED EMBODIMENT

Figure 1:
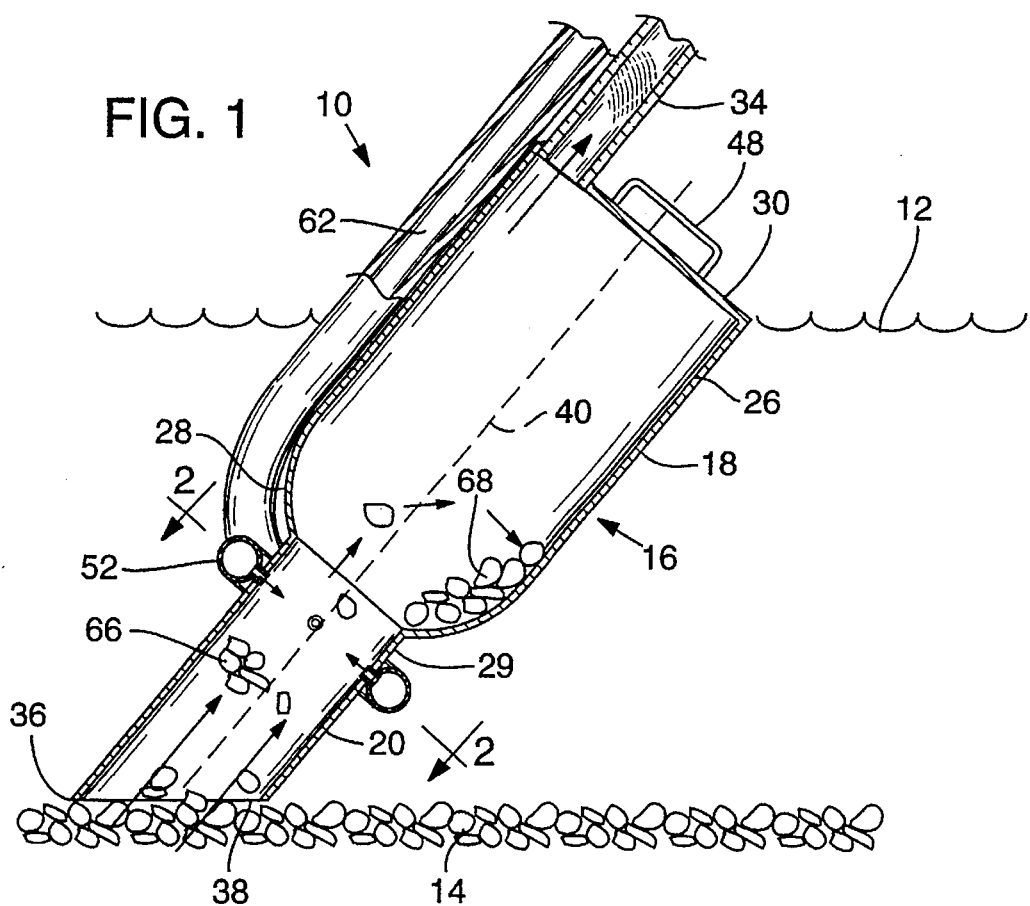
FIG. 1 is a cross-sectional view of a gravel cleaner constructed in accordance with the present invention being operated in a fish pond.

Referring to FIG. 1, a gravel cleaner 10 constructed in accordance with the invention is shown in operation submerged at an angle in a pond 12 having gravel 14 lining the pond bottom. Debris, such as uneaten fish food and waste, settles into the gravel and hardens forming a bond between individual gravel stones and creating clusters of gravel. The gravel cleaner 10 separates these gravel clusters and cleans the debris therefrom.

The gravel cleaner 10 includes an integral body 16 which is formed from suitable metal or plastic. The integral body 16 includes an upper tubular housing 18 fixedly secured end-to-end to a lower tubular housing 20 of lesser diameter than the upper housing. The upper housing 18 comprises a tubular upper wall portion 26 and an inwardly tapering lower portion 28 which connects to an upper end 29 of the lower housing 20 so that the upper and lower housings are in open communication allowing gravel to pass therebetween. The top end of the upper housing 18 is enclosed by a lid 30 having an outlet 34 therein for connection to a suction line of a pump (not shown).

The bottom end 36 of the lower housing 20 is formed at an acute angle of about forty-five degrees to a longitudinal axis 40 of the body 16. The bottom end 36 defines an inlet port 38 through which gravel can be both pumped from and dispensed back to the bottom of the pond.

Figure 3:
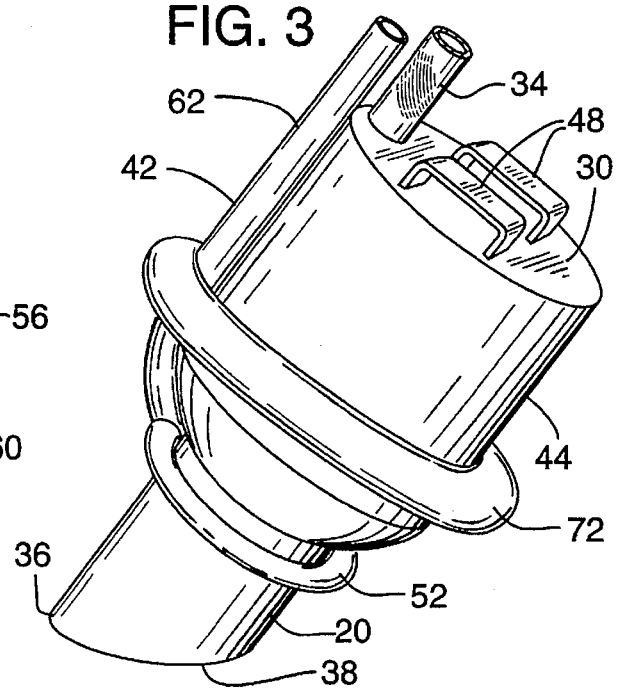
FIG. 3 is a perspective view of the gravel cleaner of FIG. 1, shown with an additional floatation device encircling the gravel cleaner.

As positioned for operation, the gravel cleaner 10 has a front 42 and a back 44 (see FIG. 3) in relation to an operator (not shown) standing behind the gravel cleaner with the inlet port 38 engaging the pond bottom, as will be further described. Two inverted U-shaped operator handles 48 are secured to the lid 30 and are aligned parallel to each other in a front-to-back direction as is more clearly shown in FIG. 3.

Partially encircling the upper end 29 of the lower housing 20 is an inlet manifold 52. As is more clearly shown in FIG. 2, the inlet manifold 52 terminates at hinged valve 54 approximately three-quarters of the way around the circumference of the lower housing 20. The hinged valve 54 is operable to release any debris from the manifold. The inlet manifold 52 has four apertures 56 therein spaced ninety degrees apart around the circumference of the lower housing 20. The manifold apertures 56 are aligned with equally sized apertures 58 in the lower housing. Short tubes 60 extend, one through each pair of aligned apertures. The manifold 52 is connected to an inlet pipe 62 (see FIG. 1) which may be an integral extension of the manifold 52. The inlet pipe 62 extends outside and parallel to the axis of the integral body 40 along the front 42 of gravel cleaner 10 and is adapted to be connected to a suitable source of water. Water pumped to the inlet manifold 52 flows through the tubes 60 and is injected radially inwardly into the lower housing 20 to break up gravel clusters located therein.

In operation, a pump (not shown) is coupled to outlet 34 through a hose (not shown). The pump draws water from the pond into inlet port 38, through the integral body 16 and out the outlet 34. Preferably the output from the pump is divided into two streams. One stream is passed to a filter, which filters the debris from the water which is thereafter returned to the pond. The second stream is connected to the manifold inlet pipe 62 so that water can be pumped into the manifold 52 and radially injected into the lower housing 20. The manifold 52 is of a smaller diameter than outlet 34 so that the flow rate through manifold 52 is less than that through the outlet. This ensures that water from the pond is drawn through inlet port 38 into lower housing 20 while manifold 52 is injecting water into the lower housing.

An operator maneuvers the gravel cleaner 10 by standing behind it and grasping the handles 48. The gravel cleaner 10 is maintained at an angle in pond 12 so that the bottom end 36 is parallel with the surface of the gravel 14 lining the bottom of pond 12, as shown in FIG. 1. The inclination of the cleaner 10 allows the operator to have greater control over it while putting less strain on the operator's back. Water being pumped through the outlet 34 creates sufficient suction at inlet port 38 so that when the operator positions the inlet port upon the pond bottom, gravel cleaner 10 is sucked partially into the gravel. The outer wall of the lower housing 20, thus, works its way into the gravel, partially separating the gravel in the pond bottom and defining the largest sized cluster to enter the gravel cleaner 10.

Figure 2:
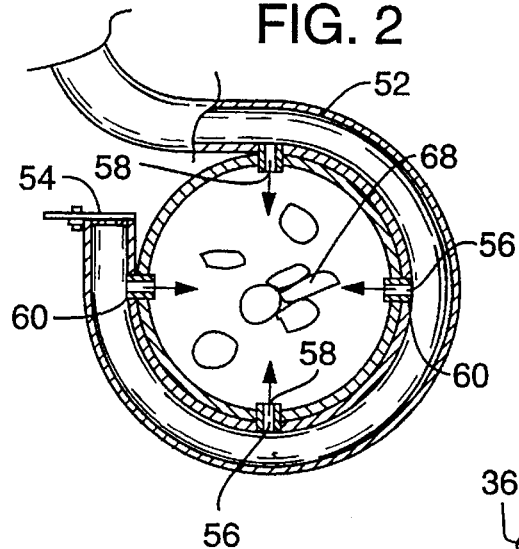
FIG. 2 is an enlarged cross-sectional view of an input manifold taken along line 2—2 in FIG. 1.

Once the gravel cleaner 10 is positioned on the pond bottom 14, the gravel at the inlet port 38 restricts the area through which pond water can flow. A pump connected to the outlet 34 is operated such that the water velocity through the lower housing 20 is sufficient to lift the gravel into the lower housing 20. Thus, gravel clusters, such as a cluster 66 shown in FIG. 1, are drawn into lower housing 20 through inlet port 38. When the cluster 66 reaches manifold 52, the water streams projected inwardly from the short tubes 60 break up the gravel cluster, as is illustrated in FIG. 2. The pumping rate of water drawn through outlet 34 is maintained such that gravel will not be lifted into the outlet 34. Consequently, because of the angle at which gravel cleaner 10 sits, the separated gravel will fall into the lower side of tapered section 28 of upper housing 18, as indicated at 68 in FIG. 1, and will trickle down the lower side of the lower housing 20 and back into the pond because of the lower flow rate of the water adjacent the lower housing wall as compared to the flow rate of the center of the lower housing 20.

Because upper housing 18 has a greater cross-sectional area than lower housing 20, the lower housing 20 restricts the size of a gravel cluster that can enter upper housing 18. This allows water to continue flowing through the upper housing past any gravel cluster contained therein. The benefits of this effect are twofold. First, if a gravel cluster was as large as the upper housing, then sufficient suction would be generated in the upper housing 18 to suck the gravel cluster against the outlet 34 blocking the outlet. This is prevented by having the smaller lower housing 20 limit the size of the gravel clusters. Second, water flowing past a gravel cluster in the upper housing helps to separate and break up the cluster.

The outlet 34 is preferably made of clear plastic so the operator can detect when only a small amount of debris is being lifted from the gravel indicating the gravel is clean. At this point, the operator should rock the gravel cleaner 10 back so as to prevent any more gravel from entering the gravel cleaner. This action also allows sufficient water to enter the gravel cleaner 10 causing a vortex motion in the upper chamber 18 to further help break up gravel clusters and clean debris therefrom.

The operator should then lift the gravel cleaner 10 away from the pond bottom. Without additional gravel entering the housings 18, 20, any gravel therein, such as indicated at 68, will fall back through lower housing 20. Manifold 52 thus has a second opportunity to break up any remaining gravel clusters as the gravel falls back through inlet port 38 to the pond bottom. In order to aid the operator in lifting gravel cleaner 10, a flotation device 72 preferably encircles upper housing 18 (see FIG. 3).

Having described and illustrated the principles of my invention with reference to preferred embodiments thereof, it will be apparent that these embodiments can be modified in arrangement and detail without departing from the principles of the invention.

For example, while the invention was shown with four jets directed radially inward in the lower housing, the manifold could be modified to have more or less than this amount.

Additionally, the manifold need not be an entirely distinct tube but can have a U-shaped outer wall which encircles the lower housing. Both ends of the "U" would be welded to the lower housing's outer wall enclosing the manifold so that water can flow therein.

One of the novel features of the invention is projecting fluid radially inward to break up gravel clusters. There are many different ways to implement this concept, which will be readily apparent to one skilled in the art. For example, each aperture in the lower housing can have a separate manifold welded perpendicularly thereto for radially projecting water into the lower housing. Additionally, the fluid is preferably water, but can be air or any other liquid substance capable of breaking up gravel clusters.

Furthermore, the bottom end of the gravel cleaner need not be angled or can have a different angle than depicted, whichever is more comfortable for a particular operator.

In view of the many possible embodiments to which the principles of our invention may be applied, it should be recognized that the illustrated embodiment is only a preferred example of the invention and should not be taken as a limitation on the scope of the invention. Rather, the scope of the invention is defined by the following claims. I therefore claim as my invention all that comes within the scope and spirit of these claims.

I claim:

1. A gravel cleaner for cleaning gravel on a pond bottom, said gravel cleaner comprising:

a tubular integral body defining an upper housing and a lower housing, said upper and lower housings being in open communication with each other, said upper housing having a major portion of a greater cross-sectional area than that of said lower housing;

said lower housing having a bottom end defining an inlet port;

said upper housing having a top end defining an outlet adapted to be connected to an inlet of a pump; and means for breaking up gravel, wherein said means includes a manifold adapted to carry fluid operatively connected to said integral body, said manifold and integral body defining holes therethrough for conveying fluid radially inwardly from said manifold into said integral body.

2. A gravel cleaner for cleaning gravel on a pond bottom, said gravel cleaner comprising:

a tubular integral body defining an upper housing and a lower housing, said upper and lower housings being in open communication with each other, said upper housing having a major portion of a greater cross-sectional area than that of said lower housing;

said lower housing having a bottom end defining an inlet port;

said upper housing having a top end defining an outlet adapted to be connected to an inlet of a pump; and a manifold adapted to carry fluid operatively connected to said integral body, said manifold and integral body defining holes therethrough for conveying fluid radially inwardly from said manifold into said integral body;

wherein said manifold encircles said integral body adjacent said lower housing.

3. The gravel cleaner of claim 1 wherein said lower housing is a tube having a longitudinal axis and said bottom end of said lower housing is at an acute angle with respect to said axis.

4. The gravel cleaner of claim 1 wherein said integral body has a front and back and wherein said bottom end is angled downwardly from said back of said integral body to said front.

5. The gravel cleaner of claim 1 having a lid secured to said top end of said upper housing.

6. The gravel cleaner of claim 5 wherein said integral body has a front, a back, a top, and a bottom;

said outlet being located in said front portion of said lid.

7. The gravel cleaner of claim 1 wherein said upper housing has a lower end connected to said lower housing, said major portion being above said lower end, said lower end tapering inwardly to its connection with said lower housing.

8. The gravel cleaner of claim 1 further including a floatation device encircling said integral body.

9. The gravel cleaner of claim 1 wherein said manifold has a smaller cross-sectional area than said outlet.

10. A gravel cleaner for cleaning gravel in a pond bottom, the gravel cleaner comprising:

an integral body having a front and a back and including tubular upper and lower housings, said upper housing comprising a tubular outer wall, a tapered lower end and an opposed, lidded top end, said lower housing comprising a tubular outer wall of lesser diameter than said upper housing tubular wall, said lower housing having a top end and a bottom end, said bottom end of said lower housing outer wall being angled downwardly from said back of said integral body to said front, said tapered lower end of said upper housing being connected to said top end of said lower housing, said upper and lower housing being in open communication with each other;

the lidded end of said upper housing having an outlet opening therethrough adjacent the front of said upper housing for connection to a suction line; and a manifold capable of carrying fluid, and adapted to be connected to a source of water under pressure, said manifold encircling said lower housing of said integral body, said manifold and lower housing having aligned apertures therein for radially and inwardly projecting water from said manifold into said lower housing.

11. The gravel cleaner of claim 2 wherein said lower housing is a tube having a longitudinal axis and said bottom end of said lower housing is at an acute angle with respect to said axis.

12. The gravel cleaner of claim 2 wherein said integral body has a front and back and wherein said bottom end is angled downwardly from said back of said integral body to said front.

13. The gravel cleaner of claim 2 having a lid secured to said top end of said upper housing.

14. The gravel cleaner of claim 13 wherein said integral body has a front, a back, a top, and a bottom;

said outlet being located in said front portion of said lid.

15. The gravel cleaner of claim 2 wherein said upper housing has a lower end connected to said lower housing, said major portion being above said lower end, said lower end tapering inwardly to its connection with said lower housing.

16. The gravel cleaner of claim 2 further including a floatation device encircling said integral body.

17. The gravel cleaner of claim 2 wherein said outlet has a first diameter and said manifold has a smaller diameter than said first diameter.

18. A gravel cleaner for cleaning gravel on a pond bottom, said gravel cleaner comprising:

a tubular integral body defining an upper housing and a lower housing, said upper and lower housings being in open communication with each other;

said lower housing having a bottom end defining an inlet port for receiving gravel to be cleaned;

said upper housing having an outlet adapted to be connected to a pump for sucking gravel to be cleaned into said inlet port;

a manifold disposed above said inlet post adapted to carry liquid operatively connected to said integral body for conveying liquid radially inwardly from said manifold into said integral body; and wherein the tubular integral body has a diameter that increases in size from said bottom end to substantially adjacent said outlet in the upper housing.

* * * * *